United States Patent

[11] 3,590,309

[72] Inventor Nephi Edward Berg
Bedford, N.H.
[21] Appl. No 835,591
[22] Filed June 23, 1969
[45] Patented June 29, 1971
[73] Assignee Hendrick Electronics Inc.
Milford, N.H.
Continuation-in-part of application Ser. No. 587,583, Oct. 18, 1966, now Patent No. 3,500,212.

[54] CHARACTER DISPLAY SYSTEM
5 Claims, 8 Drawing Figs.

[52] U.S. Cl. .... 315/18, 340/324
[51] Int. Cl. .... H01j 29/70
[50] Field of Search .... 315/18; 340/324.1

[56] References Cited
UNITED STATES PATENTS

| | | | |
|---|---|---|---|
| 3,205,488 | 9/1965 | Lumpkin, Jr. | 315/18 X |
| 3,437,869 | 4/1969 | Cobb et al. | 315/18 |
| 3,440,639 | 4/1969 | Sander et al. | 315/18 X |

*Primary Examiner*—Rodney D. Bennett, Jr
*Assistant Examiner*—Brian L. Ribando
*Attorney*—Frederick D. Goode ABSTRACT: A generator of deflection waveforms for tracing the sloped traverses of alphanumeric characters on a cathode-ray tube comprises a ring counter generating a plurality of equal square waveforms successively occurring at constant frequency. In each of a plurality of channels from the generator each square wave is converted by a diode bridge into a triangular pulse overlapping the successive triangular pulse in another channel. All the triangular pulses overlap a preceding or succeeding pulse by an equal interval of time. Further in each channel an attenuator network modified the amplitude of each triangular pulse. The modified triangular pulses are all combined at a summing junction to form the several traverses of a composite waveform which produces the horizontal or vertical deflection voltage which causes the cathode-ray to trace a character on the screen of the tube.

INVENTOR
NEPHI EDWARD BERG
BY
Chittick, Pfund, Birch, Samuels & Gauthier
ATTORNEYS

INVENTOR
NEPHI EDWARD BERG

BY
Chittick, Pfund, Birch
Samuels & Gauthier
ATTORNEYS

CHARACTER DISPLAY SYSTEM

RELATED APPLICATIONS

This application is a continuation in part of my copending application Ser. No. 587,583, now Pat. Ser No. 3,500,212, filed Oct. 18, 1966.

Voltage signals of predetermined form or pattern may, for example, be applied to the X and Y coordinates deflection circuits of a cathode-ray tube to cause the tube to trace a desired figure, curve, symbol or alphanumeric unit, all of which are hereinafter referred to as characters. Thus a letter may be formed by a series of strokes or traverses, each stroke being produced by simultaneous linear excursions or increments of the X and Y deflection voltages. For each character to be produced there are two predetermined deflection voltage signals or waveforms whose increments represent the X and Y coordinates of the character traverses.

Objects of the present invention are to provide apparatus for rapid and repeated generation of signals of predetermined waveform of the analog or deflection types, which is greatly simplified, economical, and stable.

For the purposes of illustration a typical embodiment of the invention is shown in the accompanying drawing in which.

Figure 1:
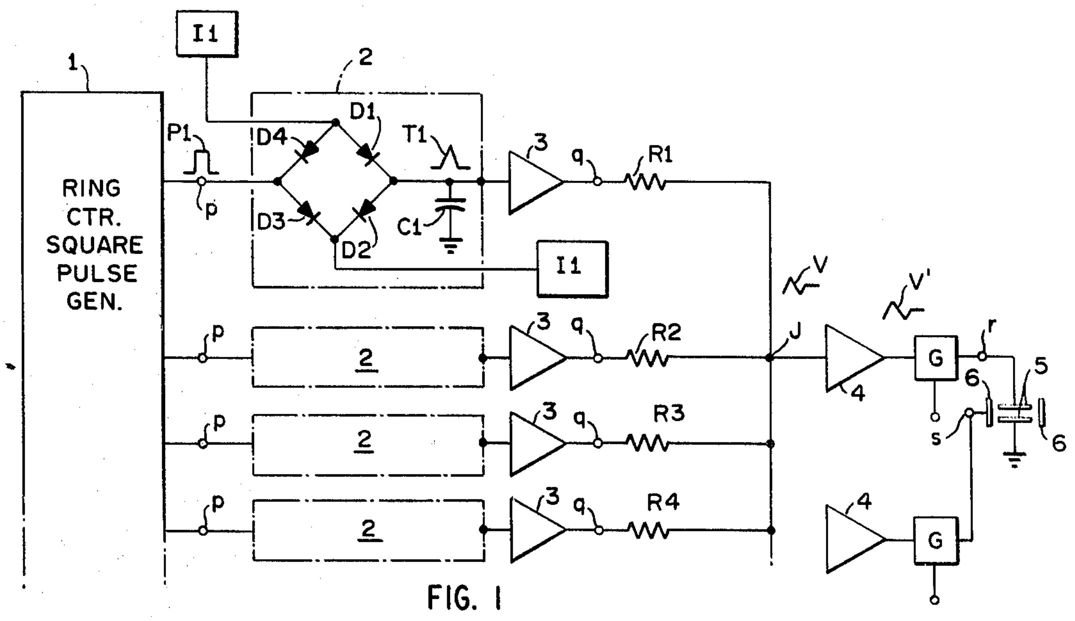
FIG. 1 is a diagram of a character deflection voltage generating circuit.
Figures 2, 3, 4, 5:
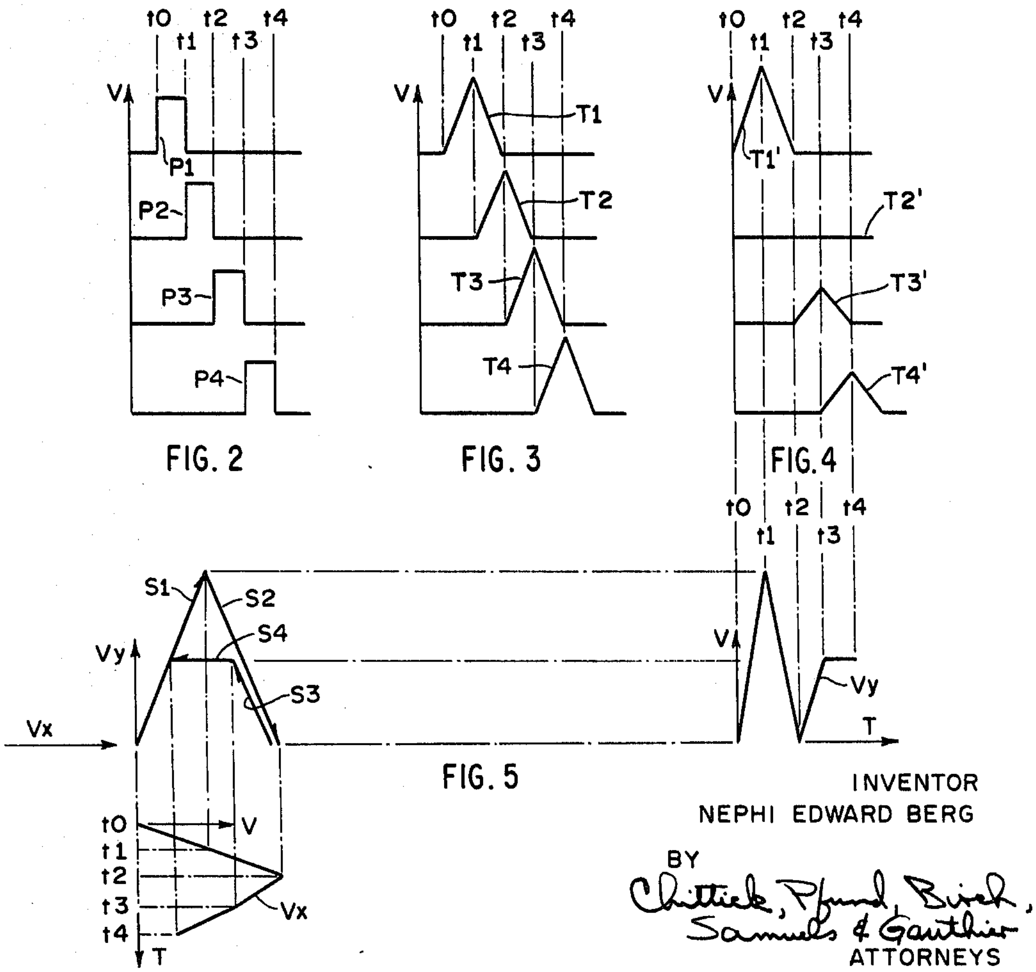
FIGS. 2 to 5 are graphic representations of the steps in electrically generally the character A.

The circuit shown in FIG. 1 comprises a ring counter 1 having a plurality of outputs *p*, at each of which appears a positive square wave pulse P1, P2, etc. typically of +8 volts, and of form shown in FIG. 2. Such an oscillator is known and comprises timing means which forms pulses equal in amplitude and duration and at a constant frequency of, for example, 1 megacycle per second. Thus the interval from time $t0$ to time $t1$ of the first pulse P1 is the same as the interval $t1$ to $t2$ of the second pulse P2, and so on. Connected to each output *p* is a converter 2 comprising a diode bridge B2R having a positive constant current supply I1, e.g. 2 milliamperes at +6 volts, and a negative constant current supply, e.g. 2 milliamperes at −10 volts.

Figure 6:
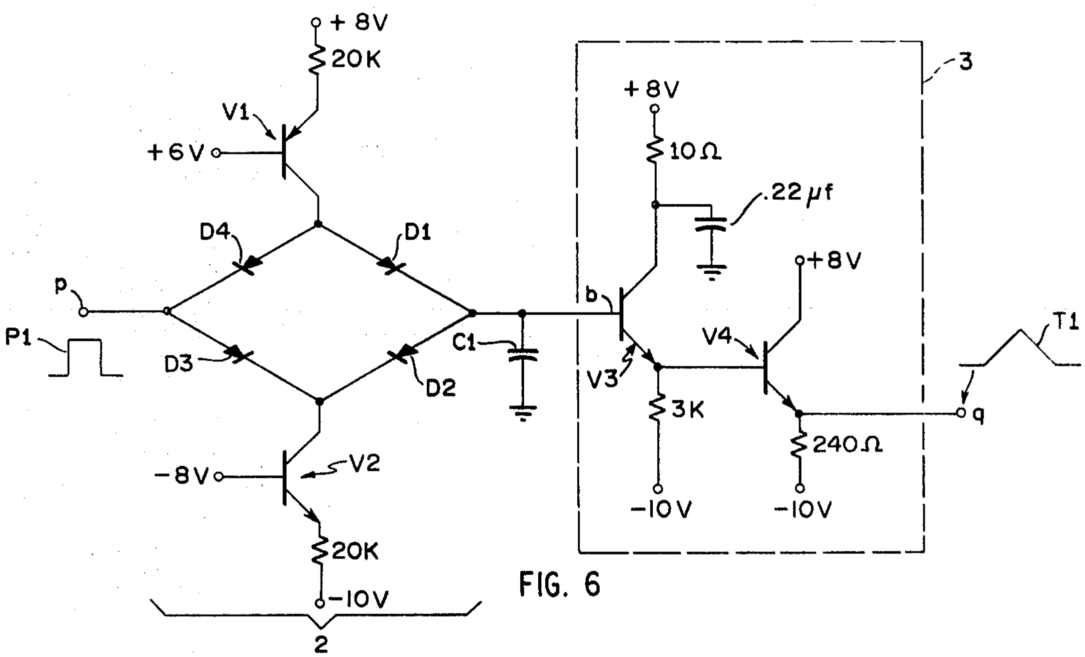
FIGS. 6 and 7 are schematic diagrams of portions of the circuit of FIG. 1.

As shown in more detail in FIG. 6 the diode bridge D1—D4 is supplied by a positive constant current source comprising a transistor V1 (type 2N706) having a +8 volts emitter supply and held conducting a constant current with a constant base bias of about +6 volts. Similarly a negative 10 volt supply voltage applied to a transistor V2 on the opposite side of the bridge is held conducting constant current by a −8 volts bias, as follows:

Prior to the initial positive rise of a square wave input pulse such as P1, both sides D1, D2 and D3, D4 of the bridge conduct constant current. The potential across the virtually discharged capacitor C1 and at the base *b* of transistor V3 is approximately at ground. When the square wave pulse at terminal P rises at time $t0$ to a peak value of about +4 volts, diodes D2 and D4 are back biased and cut off. Current from the positive supply then charges the capacitor to about +2 volts. At the end of the square wave pulse P1 at time $t1$, the positive potential of the capacitor back biases diode D1 and the capacitor discharges through diode D2 to the negative supply.

During charge and discharge the potential at the capacitor C1 and base *b* of transistor V3 has risen to a positive peak during time $t0$ to $t1$ and fallen to its original level from time $t1$ to time $t2$. By virtue of the constant current character of the supplies no resistance enters into the charging and discharging of capacitor C1, and its voltage excursions are linear and equal and opposite in slope.

The several output terminals *q* are connected through resistances R1, R2, R3, R4, etc. to a summing junction J. These resistances have ohmic values selected to reduce the amplitude of the triangular voltages T1, etc. by different amounts so as to produce attenuated triangular voltages T′1, etc. as shown in FIG. 4. From FIG. 4 it can be seen that resistor R1 has a very low or nearly zero value and voltage T′1 is not attenuated with respect to voltage T. Resistance R2 has an extremely high or open circuit value so that voltage T′2 is attenuated to zero level. Resistances R3 and R4 have intermediate values and produce voltages T′3 and T′4 attenuated about one-half. typical values for the attenuator resistances are given hereinafter in connection with the description of FIG. 7. The attenuated voltages retain their equal frequency, duration and overlap, but are added together during transmission through the resistors to the summing junction J. This addition is shown graphically by projection of FIG. 4 to FIG. 5.

As shown in FIGS. 4 and 5, from time $t0$ to time $t1$ attenuated triangular pulse T′1 appears as an upward excursion from zero of voltage V*y* appearing at the junction J. From time $t1$ to time $t2$ the downward excursion of pulse T′1 is added to pulse T′2. Pulse T′2 remaining at zero level, however, the junction voltage V*y* follows pulse T′1 to zero. From time $t2$ to time $t3$ the junction voltage follows the upward excursion of pulse T′3 to an intermediate amplitude unaffected by the overlap with zero level pulse T′2. From time $t3$ to time $t4$ the upward excursion of pulse T′4 is compensated by the equal and opposite excursion of pulse T′3 thereby holding voltage V*y* at the intermediate level. By suitable blanking techniques the subsequent excursion of pulse T′4 is blocked from entering into the generation of waveform V*y*.

Waveform V*y* of FIG. 5 represents the time versus vertical amplitude of a cathode-ray tube deflection voltage. Waveform V*x* represents the horizontal deflection voltage and is generated by a circuit generally identical with that of FIG. 4, but with attenuator resistors selected to produce suitable excursions of waveform V*x* during the same time intervals $t0$ to $t1$, etc. projected from waveforms V*x* and V*y* is the character A which the flying spot of a cathode-ray tube traces when the signals V*x* and V*y* are applied respectively to its horizontal and vertical deflection circuits. During time $t0$ to time $t1$ the excursions of voltages V*x* and V*y* produces a traverse or stroke S1 along one leg of the character A. During the subsequent time intervals strokes S2, S3 and S4 complete the tracing of the character.

The vertical deflection signal V at the junction J is amplified in a typical amplifier stage 4 and the amplified signal V′ is applied through a gate G to the cathode-ray input *r* of deflection circuits indicated as deflection plates 5 for the vertical signal component V*y*. The gate is opened from time $t0$ to time $t4$ and blanks out excursions of voltages V*y* occurring outside this interval. Simultaneously the corresponding horizontal deflection voltage is gated through a terminal *s* to the horizontal deflection system shown as plates 6.

While a four stroke character requiring only four resistors is shown and has been given as an example, other more elaborate characters will require more strokes and resistors.

Figure 7:
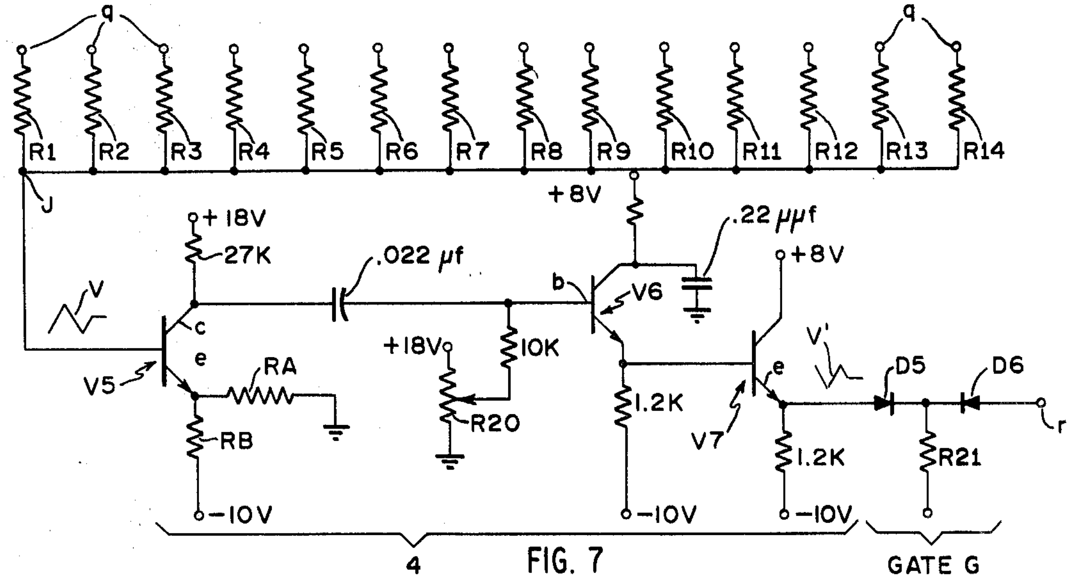

FIG. 7 shows 14 attenuator channels connected between the triangular pulse amplifier terminals *q* and the summing junction J, followed by an example of the amplifier 4 and gate G of FIG. 1. Such channels will produce characters with up to 14 strokes and consequent finer detail. The table below gives values in kilohms of the resistors for 11 stroke X and Y deflection voltages for the character A, and for a 12 stroke character B.

| | Character A | | Character B | |
|---|---|---|---|---|
| | V*x* | V*y* | V*x* | V*y* |
| R1 | 10.0 | Open | 4.99 | Open. |
| R2 | 3.92 | 2.61 | 4.99 | 2.87. |
| R3 | 2.87 | 1.62 | 4.99 | 1.93. |
| R4 | 2.0 | 1.0 | 4.99 | 1.0. |
| R5 | 1.58 | 1.5 | 1.65 | 1.0. |
| R6 | 1.3 | 3.09 | 1.33 | 1.18. |
| R7 | 1.1 | Open | 1.33 | 1.54. |
| R8 | 1.1 | 3.09 | 1.65 | 2.0. |
| R9 | 1.3 | 3.09 | 4.99 | 2.0. |
| R10 | 2.0 | 3.09 | 1.65 | 2.0. |
| R11 | 4.32 | Open | 1.43 | 3.32. |
| R12 | Open | do | 1.18 | Open. |
| R13 | do | do | Open | Do. |
| R14 | do | do | do | Do. |
| RA | 1.1 | 1.4 | 0.953 | 0.887. |
| RB | 2.61 | 3.3 | 2.21 | 2.05. |

Values of the resistors RA and RB in the amplifier circuit 4 are also given

The amplifier 4 for each deflection voltage amplifier comprises three transistor stage V5 (2N706), V6 (2N706) and V7 (2N696). The emitter *e* of the first stage V5 is biased by voltage dividing resistors RA and RB between a −10 volt supply and ground so as to establish the gain of stage V5. The maximum range of voltage excursion at the emitter *e* of the third stage V7 and hence the maximum excursion of the deflection voltage is thereby established. The baseline voltage from which the deflection voltage rises is determined by a potentiometer R20 between the base *b* of the second stage V6 for the AC coupled amplifier 4 shown. The amplifier may be DC coupled with suitable bias and baseline adjustment.

The negative going amplified deflection voltage V′ at the output of each amplifier 4 is applied to a gate circuit G comprising two type 1N4009 diodes D5 and D6 connected in opposite polarity to a gating pulse input resistor R21 (180 ohms). In the absence of a gating pulse the deflection waveform V′ is blocked from the deflection terminal *r* or *s*. By means of a manual switch or a programmer, not shown, the Y deflection signal Vy is transmitted to the input terminal *r* by application through the resistor R21 of a square wave gating pulse of greater negative voltage than the maximum of the deflection voltage. Similarly the corresponding X deflection voltage V*x* is gated simultaneously to the input terminal *s*. The duration of the square wave gating pulse corresponds with the duration of deflection voltage. For example, with the deflection voltages of FIG. 5 the duration is *t*0 to *t*4; for the deflection voltages V*x* and V*y* for character A of the table the duration is *t*0 to *t*11; and for the character R, *t*0 to *t*12.

Figure 8:
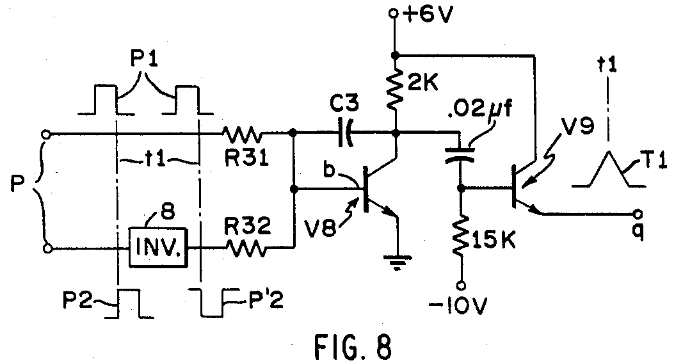
FIG. 8 is a schematic diagram of another form of the circuit of FIG. 6.

The alternative triangular wave generator shown in FIG. 8 comprises two inputs *p* for successive square wave pulses, e.g. P1 and P2 of the generator 1 of FIG. 1. The earlier pulse P1 goes positive from a zero baseline to about 3.5 volts and is applied through a 100 ohm resistor R31 to the base *b* of an integrator stage V8. The succeeding pulse P2 is inverted in polarity in an inverter 8 with unity gain to form a pulse P′2 negative going from 3.5 volts positive to zero baseline. The second pulse P′2 is applied through a 100 ohm resistor to the base *b* of the integrator V8, which base *b*, in the absence of a pulse floats at about +1.75 volts. A 300 micromicrofarad capacitor C3 combines with resistors R31 and R32 to form an integrating network for the input pulses P1 and P′2. These pulses are summed at the base *b* and cause the voltage at the base to rise substantially linearly from 1.75 volts to 3.5 volts during the interval of the first pulse P1. Then during the interval of the second pulse P′2 the voltage returns linearly to 1.75 volts. This triangular voltage excursion is amplified in stage V8 and coupled by an 0.02 microfarad capacitor to the base of an emitter follower V9, type 2N706, at whose emitter output *q* triangular waveform T1 appears.

While certain desirable embodiments of the invention have herein been illustrated and described, it is to be understood that these are mainly by way of example, and the invention is broadly inclusive of any and all modifications falling within the scope of the appended claims.

I claim:

1. A cathode ray character display system comprising:
 - a. a cathode-ray indicator tube;
 - b. deflection means operable to deflect the beam in said tube in response to two-dimensional displacement components to trace a visible image on the screen of said tube;

- c. fixed time increment wave generator means adapted to be coupled to said deflection means for supplying signals to produce said two-dimensional displacement components, said wave generator means including means for producing repetitively in parallel a synchronous fixed time duration set of continuous sequence pairs of linear waves for tracing a continuous luminous path forming said visible image for a selected character on said screen the slope of which linear waves can be positive, negative or zero to correspond with the deflection increments required for any selected character; and
 - d. means selectively operable for coupling selected sets of sequential pairs of fixed time increments linear waveforms from said wave generator means to said deflection means for tracing a selected predetermined character on said screen as an uninterrupted visible trace.

2. Apparatus according to claim 1 and including means for controlling the base line position for said beam from which the deflection of said beam in response to said signals occurs.

3. Apparatus according to claim 1 in which said means for producing repetitively a synchronous set of continuous sequence pairs of linear waves comprises, for each such wave generated:
 - a wave source of positive and negative slope portions coextensive in time with said linear wave and means for adding said portions in predetermined ratio to produce said wave portion of the desired slope.

4. Apparatus according to claim 1 in which said signals are produced with predetermined waveform during a given time interval by said wave generator further characterized by:
 - means for generating a succession of separate substantially triangular pulses during said interval each pulse having positive and negative slope portions, the negative slope portion of one being equal in duration to a corresponding positive slope portion of an adjacent wave in said succession;
 - means timing said pulses to start each succeeding pulse at the peak point of the next preceding pulse throughout said interval for producing time overlap of the corresponding equal duration opposite slope portions of adjacent pulses;

means for modifying the relative amplitude of said separate pulses; and
 - means for combining the modified amplitude pulses to synthesize said predetermined waveform from increments the magnitude and direction of which are determined by the relative amplitude of the adjacent pulses combined, said time overlap of said opposite slope portions providing for positive, zero or negative slope increments.

5. The method of generating a character display where characters are formed by a fixed succession of continuous visible strokes comprising the steps of
 - a. generating equal and opposite slope waves that overlap in time and are of duration equal to the individual strokes used to trace said character;
 - b. adding overlapping pairs of said opposite slope waves with predetermined relative amplitude to obtain linear waves of any desired slope each of which is the sum of one of said pairs; and
 - c. selectively applying two predetermined sets of successive said linear waves to trace each predetermined character, the strokes of each character being generated as the resultant of corresponding pairs of the linear waves of the selected sets.